US012798109B2

(12) United States Patent
Wang et al.

(10) Patent No.: US 12,798,109 B2
(45) Date of Patent: Nov. 17, 2026

(54) LLM DRIVEN MULTIMODAL HUMAN-ROBOT INTERACTION PLANNING

(71) Applicant: Honda Motor Co., Ltd., Tokyo (JP)

(72) Inventors: Chao Wang, Offenbach/Main (DE); Michael Gienger, Offenbach/Main (DE); Frank Joublin, Offenbach/Main (DE); Antonio Ceravola, Offenbach/Main (DE)

(73) Assignee: Honda Motor Co., Ltd., Tokyo (JP)

( * ) Notice: Subject to any disclaimer, the term of this patent is extended or adjusted under 35 U.S.C. 154(b) by 79 days.

(21) Appl. No.: 18/976,276

(22) Filed: Dec. 10, 2024

(65) Prior Publication Data

US 2025/0196363 A1 Jun. 19, 2025

(30) Foreign Application Priority Data

Dec. 13, 2023 (EP) .................................... 23216146

(51) Int. Cl.
*B25J 9/16* (2006.01)
*B25J 11/00* (2006.01)

(52) U.S. Cl.
CPC ........... *B25J 11/0005* (2013.01); *B25J 9/163* (2013.01); *B25J 9/1653* (2013.01); *B25J 9/1661* (2013.01); *B25J 9/1697* (2013.01)

(58) Field of Classification Search
USPC .................................................. 700/245–264
See application file for complete search history.

(56) References Cited

U.S. PATENT DOCUMENTS 9,751,212 B1 * 9/2017 Martinson .............. G06N 3/008
11,548,144 B2 * 1/2023 Moon .................... G06N 3/008
(Continued)

FOREIGN PATENT DOCUMENTS

CN 107340865 12/2020
CN 116301388 8/2023

OTHER PUBLICATIONS

Bowen Zhang et al., "Large Language Models as Zero-Shot Human Models for Human-Robot Interaction", retrieved from arXiv database, arXiv:2303.03548v1 [cs.RO], Mar. 6, 2023, pp. 1-8.
(Continued)

*Primary Examiner* — Jonathan L Sample
(74) *Attorney, Agent, or Firm* — JCIPRNET

(57) ABSTRACT

A computer-implemented method for controlling a robot collaborating with a human in an environment of the robot comprises: obtaining, by at least one sensor, multimodal information on the environment of the robot including information on a human acting in the environment; converting, by a first converter, the obtained multimodal information into text information; estimating, by an intent estimator, an intent of the human based on the text information; determining, by a state estimator, a current state of the environment including the human based on the text information; planning, by a behavior planner, based on the current state of the environment and the estimated intent of the human, a behavior of the robot including at least one multimodal interaction output for execution by the robot, and generating control information including text information on the at least one multimodal interaction output; converting, by a second translator, the generated text information into multimodal actuator control information; and controlling at least one actuator of the robot based on the multimodal actuator control information.

13 Claims, 7 Drawing Sheets

(56) References Cited

U.S. PATENT DOCUMENTS

| | | | | |
|---|---|---|---|---|
| 11,583,998 | B2 * | 2/2023 | Moon | B25J 9/0003 |
| 11,607,801 | B2 * | 3/2023 | Chae | A47L 9/2857 |
| 12,597,420 | B2 * | 4/2026 | Wang | G06F 3/011 |
| 2014/0249676 | A1 * | 9/2014 | Florencio | G06N 3/008 700/258 |
| 2014/0277735 | A1 * | 9/2014 | Breazeal | B25J 9/0003 700/259 |
| 2020/0016745 | A1 * | 1/2020 | Tang | B25J 11/0005 |
| 2021/0046655 | A1 * | 2/2021 | Deyle | B25J 9/1664 |
| 2021/0086370 | A1 * | 3/2021 | Zhang | B25J 13/08 |
| 2023/0173683 | A1 * | 6/2023 | Gomez | B25J 11/001 700/246 |
| 2023/0311335 | A1 * | 10/2023 | Hausman | B25J 9/1697 700/246 |

OTHER PUBLICATIONS

Yang Ye et al., "Improved Trust in Human-Robot Collaboration With ChatGPT", IEEE Access, Jun. 1, 2023, pp. 55748-55754, vol. 11.

Moritz A. Graule et al., "GG-LLM: Geometrically Grounding Large Language Models for Zero-shot Human Activity Forecasting in Human-Aware Task Planning", retrieved from arXiv database, arXiv:2310.20034v1 [cs.RO], Oct. 30, 2023, pp. 1-7.

Hang Su et al., "Recent advancements in multimodal human-robot interaction", Frontiers in Neurorobotics, May 11, 2023, pp. 1-21.

Xufeng Zhao et al., "Chat with the Environment: Interactive Multimodal Perception Using Large Language Models", retrieved from arXiv database, arXiv:2303.08268v2 [cs.RO], Aug. 1, 2023, pp. 1-7.

* cited by examiner

LLM DRIVEN MULTIMODAL HUMAN-ROBOT INTERACTION PLANNING

CROSS-REFERENCE TO RELATED APPLICATION

This application claims the priority benefit of European application serial no. 23216146.3, filed on Dec. 13, 2023. The entirety of the above-mentioned patent applications are hereby incorporated by reference herein and made a part of this specification.

TECHNICAL FIELD OF THE DISCLOSURE

The disclosure is in the field of robotics and concerns human-robot interaction. In particular, a method for controlling a robot collaborating with a human based on multimodal information and a corresponding system is proposed.

TECHNICAL BACKGROUND

In current approaches for designing human-robot interaction, engineers specialized in the field of robotics establish rules based on the context of an application scenario and a multimodal input from a user in order to define how the robot should react in the specific situation, and to generate an output accordingly. This represents a challenging task, as manually setting up the robot's interactive behavior in a specific situation is complex and requires considerable effort by a specialized engineer.

For example, patent CN 107340865 B discloses a robot interaction method, which concerns a virtual interaction between a user and a virtual robot that has a preset personality and a background story. A robot capability interface parses single-modal or multi-modal interaction instructions obtained from the user and categorizes an intent of the obtained interaction instructions. The virtual robot sets a personality and determines settings based on a current application scenario. Multi-modal response data associated with the background story is generated; a virtual robot image outputs the multi-modal response data to the user. CN 107340865 B only regards virtual robots obtaining information including audio, image, video, or touch information, and text information from the user as interaction instructions, and outputting multimodal response data in the form of text response data, audio response data, image response data, and video response data to the user, and largely relies on preset data, e.g., the personality and a background story. Thus, CN 107340865 B requires manually setting up the virtual robot's interactive behavior for the specific situation, is complex and requires considerable effort by a human expert.

There exist some approaches to use large-language models (LLMs) for driving robotic planning that base on large amounts of human-generated text data. Some research investigates LLM driven user interfaces. LLM driven user interfaces rely on speech as means for the user to interact with the robot, use the LLM to predict a state of the user and to determine an intent of the user, and control the robot using zero-shot human models.

Concerning natural language processing models, the term zero-shot prompting refers to a technique of providing a prompt to the model that is not part of a set of training data for training the model. The model has the capability to generate a result that the provided prompt desires. This technique makes large language models useful for many tasks in a variety of application scenarios.

The publication by ZHANG, Bowen, et al., Large Language Models as Zero-Shot Human Models for Human-Robot Interaction, Mar. 6, 2023: [retrieved on Oct. 27, 2023], retrieved from <arXiv preprint arXiv: 2303.03548>, concerns integration of pre-trained LLM-based human models in the planning process for controlling a social robot replacing purpose-built robots. The authors conclude LLMs to be potentially effective task-level human-models with regard to high-level human states and behavior modelling. However, the authors also estimate current LLM-models unlikely to be accurate human-models on their own due to difficulty in accounting for low-level geometrical shape features as current LLMs have limitations in spatial and numerical reasoning and thereby in action planning for the robot.

The approaches using LLM-based human models rely on speech as the interaction modality between the robot and a human user. Implementations of the behavior planner for planning the behavior of the robot use zero-shot techniques and currently have limitations with regard to planning of individual actions.

SUMMARY

Taking the aforementioned issues into account, the current framework for planning human-robot interaction in a collaborative environment may be subject for improvement.

The computer-implemented method according to independent claim 1 and the computer program and the system according the corresponding independent claims address these issues in an advantageous manner.

The dependent claims define further advantageous embodiments.

The computer-implemented method for controlling a robot assisting a human in an environment of the robot according to the first aspect comprises a step of obtaining, by at least one sensor, multimodal information on the environment of the robot including information on at least one human acting in the environment. "Multimodal information" is information comprising a plurality of individual information items, and each of these information items is provided using a certain modality. Multimodal in this context means that at least two different modalities are used to provide the information, for example, visual and audio. The method proceeds with converting, by a first converter, the obtained multimodal information into (first) text information. An intent estimator then estimates an intent of the at least one human based on the (first) text information provided by the first converter. A state estimator determines a current state of the environment including the at least one human based on the (first) text information provided by the first converter. A behavior planner then plans, based on the current state of the environment and the estimated intent of the at least one human, a behavior of the robot including at least one multimodal interaction output for execution by the robot. A multimodal interaction output corresponds to a "multimodal action" that is a combination of a plurality of "single mode actions" that belong together, for example, a combination of a movement as an example for a single mode action and verbal explanation thereof as an example for another single mode action using different modality. The behavior planner generates control information including (second) text information on the at least one multimodal action included in the planned behavior. The method then executes a step of converting, by a second converter, the generated (second) text information into multimodal actuator control information. In a subsequent step, the method proceeds by controlling at least one actuator of the robot based on the multimodal actuator control information.

In particular, the behavior planner may perform planning using a large language model (LLM).

The known approaches of applying LLMs in behavior planning for robots only use speech input to estimate the needs and intentions of the human user. A multimodal input from the environment, and in particular from the user is not shown in the current approaches. LLMs are restricted to a use in scenarios involving virtual robots only. Hence, the LLMs have no capability to drive the other interaction modality of the robot, e.g., gaze, intent and a graphical user interface (GUI). Even more, in particular current LLMs lack the ability to obtain input in a plurality of input modalities, exceeding the current, exclusively text based input. Thus, a more versatile reaction to the human while collaboratively addressing tasks in the shared environment is possible. Typically, a human uses not only spoken text, but also relies on gestures and gaze for communication. Known approaches using LLMs fail to take this additional modalities into account.

The computer-implemented method obtains multimodal input from the environment of the robot that includes text information and non-text information, which the first converter (x-to-text converter, x-to-text translator) converts from non-text information into text information. It is to be noted that the terms x-to-text and text-to-x hereinafter used for explaining the disclosure do not only mean a conversion (translation) to or from text but also more generally to or from a text based data structure, such as a "JSON object", or vector/tensor, or any format that LLM is good at dealing with. Hence the behavior planner performs behavior planning on text information, although the originally obtained information included multimodal information that exceeded pure text information, e.g. speech in form of either written or spoken language. The first converter converts multimodal input information (the "x") into a data format a LLM can process. The (first) text information into which the first converter converts the multimodal information, is in a format that the behavior planner, the intent estimator and the state estimator, in particular when implemented by an LLM, are able to process. In particular, the format is a text-based format or text-based data structure, including data structures such as a tensor or vector. For example, the text-based data structure may be JavaScript Object Notation (JSON) object, which is a standard text-based format for representing structured data based on JavaScript object syntax. The text information may be include a function-calling command.

The known frameworks support approaches that support speech as the interactions means between human and robot. Contrary thereto, the computer-implemented method uses the text-based LLM within the planning process for driving the interaction means of the robot.

The computer-implemented method provides a framework for performing planning of a robot behavior and actions of the robot with a human model that includes a large language model. The framework bases on a capability of translating human's multimodal input and observed states of the environment into text and a capability of translating the multimodal output from text into control information for the robot, thereby supporting a multimodal social interaction based on human modelling in text form.

The method enables to control the robot to perform actions that physically influence the environment. This exceeds known approaches, which combine the use of LLMs in behavior planning processes to a virtual, non-physical interaction by acoustic or visual modes of communication. The computer-implemented method uses the second converter, in particular a text-to-x converter (text-to-x translator) for enabling a multimodal output based on the text information resulting from the planning process, thereby generating control information for the robot, and supporting the human via executing a multimodal action. The (second) text information provided by the LLM and converted by the second converter is in particular in a text-based format or a text-based data structure, or a data structure such as a tensor or vector. For example, the text-based data structure may be a JSON object or a function-calling command.

A system for controlling a robot that assists a human in an environment of the robot addressing the aforementioned issues and objects comprises at least one sensor configured to obtain multimodal information on the environment of the robot including information on at least one human acting in the environment. The system further comprises a first translator configured to convert the obtained multimodal information into (first) text information, an intent estimator configured to estimate an intent of the at least one human based on the (first) text information, and a state estimator configured to determine a current state of the environment including the at least one human based on the (first) text information. A behavior planner of the system is configured to plan, based on the current state of the environment and the estimated intent of the at least one human, a behavior of the robot including at least one multimodal action for execution by the robot. The behavior planner is further configured to generate control information including (second) text information on the at least one multimodal action. The system further includes a second translator configured to convert the generated (second) text information into multimodal actuator control information, and a controller configured to control at least one actuator of the robot based on the multimodal actuator control information.

BRIEF DESCRIPTION OF THE DRAWINGS

The following description of embodiments refers to the figures, in which.

In the figures, corresponding elements have the same reference signs. The discussion of the figures avoids discussion of same reference signs in different figures wherever considered possible without adversely affecting comprehensibility and avoiding unnecessary repetitions for sake of conciseness.

DETAILED DESCRIPTION

Figure 1:
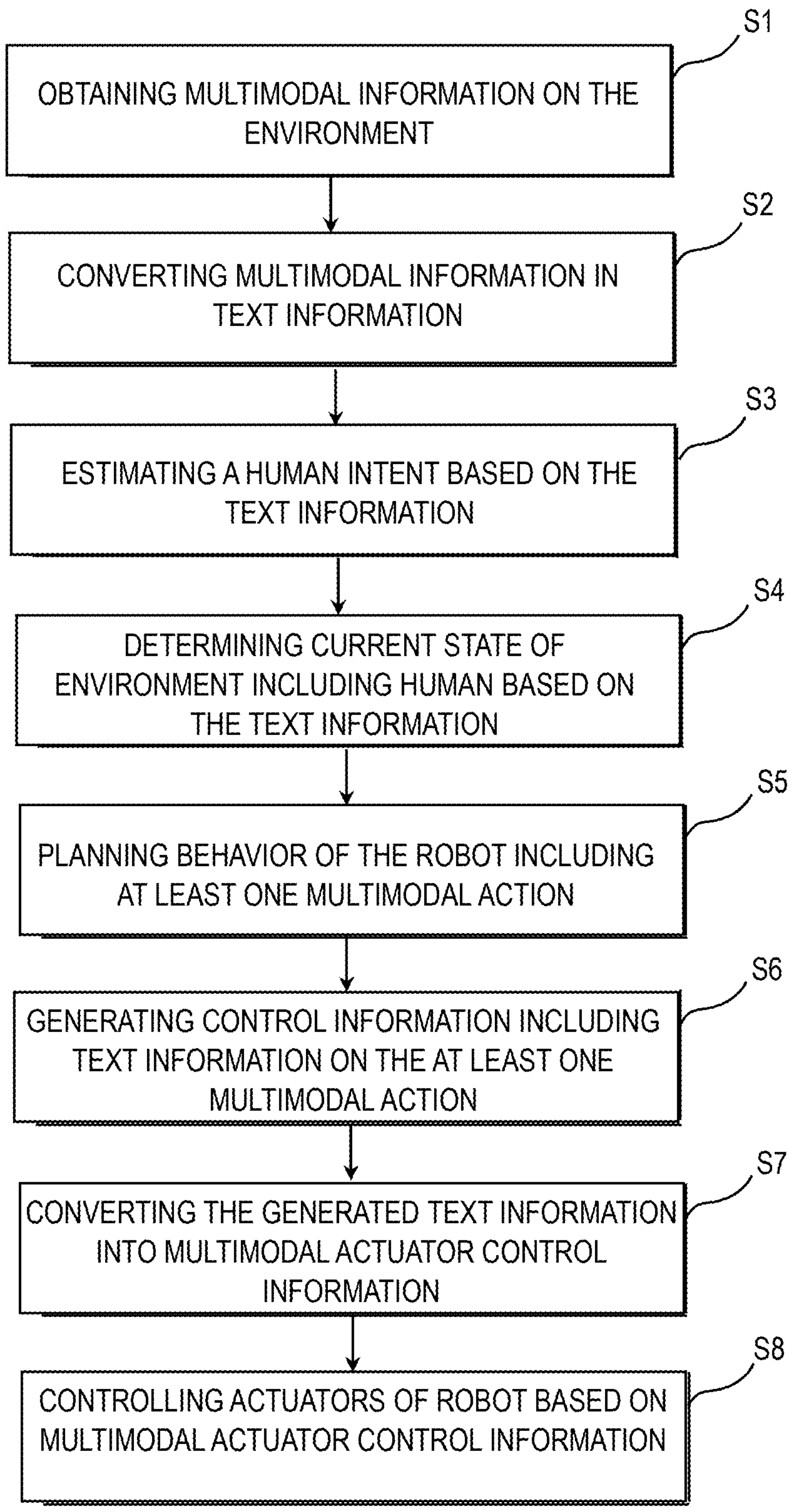
FIG. 1 shows a schematic flow diagram of a computer-implemented method according to an embodiment.

The computer-implemented method provides a framework for a comprehensive assistance to the human by the robot and for an interaction of the robot with the assisted human in a variety of modes of interaction that may include language as text or speech, but also gestures, facial expressions, actions executed with objects, movements in the common environment of the robot and the human, in a comprehensive collaboration with each other.

According to an embodiment of the computer-implemented method, the first converter includes a large language model LLM, a rule-based x-to-text translator or a model based x-to-text translator.

According to an embodiment of the computer-implemented method, the second converter includes a large language model LLM, a rule-based text-to-x translator or a model based text-to-x translator.

The computer-implemented according to an embodiment includes, in the step of planning the behavior of the robot, performing the planning using a large language model.

In an embodiment of the computer-implemented method, the text information (first text information) and the generated control information including the text information (second text information) are in a format interpretable by the large language model. The text information and the generated control information including the text information are in at least one of a text data format, a JSON object, a tensor, a vector, or a function-calling command.

Thus, a large language model may be used for planning multimodal the multimodal interaction of the robot with the human.

The computer-implemented method according to an embodiment includes performing prompt engineering for structuring text included in the large language model for executing functions including intent estimation, state estimation, and behavior planning based on the multimodal information converted into text information.

Hence, the large language model is specifically adapted to plan multimodal interaction output for the robot that enables collaboration with the human.

According to an embodiment of the computer-implemented method, the method comprises obtaining model data of the large language model from an external database.

The computer-implemented according to an embodiment comprises generating training data based on an observed human-human interaction in the environment.

According to an embodiment of the computer-implemented method, the method further comprises steps of acquiring feedback from the assisted human, and learning model data for the behavior planner based on the acquired feedback.

The computer-implemented according to an embodiment includes obtaining, by the at least one sensor, multimodal information on the environment of the robot including information on the at least one human including a first human and the at least one second human acting in the environment, converting, by the first converter, the obtained multimodal information into text information, determining a sequence of human-human interaction involving the first human and the at least on second human based on the text information, and updating the human model based on the sequence of human-human interaction.

The computer-implemented method further provides a capability to learn from observing human-human activity in the environment, which the structure of patent CN 107340865 B does not support. The suggested framework translating human's multimodal input and multimodal output into text for learning social interaction by observing human-human interaction, later using this prior knowledge to drive multimodal output for robot-human interaction.

Thus, the method feeds collected data to LLMs as example for guiding human-robot interaction via the learned human model.

According to an embodiment of the computer-implemented method, the method further comprises acquiring, via a user interface, label information including at least one of at least one hidden state associated with the sequence of human-human interaction, and a feedback rating of at least one reaction included in the sequence of human-human interaction.

The computer-implemented method according to an embodiment further comprises providing, to the behavior planner, the text information including information on use of atomic animation clips that drive actuators of the robot; and concatenating, by the behavior planner, at least two atomic animation clips for generating a new behavior of the robot, or synchronizing different modalities of the multimodal interaction output based on the information on the use of the atomic animation clips.

Atomic animation clips are clips or chunks that define a basic social behavior that the actuators of the robot execute. The atomic animation clips include semantic labels in text format, which a large language model can process and understand. A semantic label may include, e. g., "look up", "nod" for atomic animation clips that correspond to a respective movement of a head of a humanoid robot, or "move forward", "move backward" for ears arranged at the head of the humanoid robot. Concatenating the atomic animation clips enables the large language model to generate complex behaviors of the robot. Thus, the atomic animation clips have the effect of bridging a gap between semantic commands, which the large language model processes, and behaviors and actions executed by the robot.

A non-transitory computer-readable storage medium embodying a program of machine-readable instructions executable by a digital processing apparatus that cause the digital processing apparatus to perform operations according to one of the embodiments of the computer-implemented method.

A computer program comprising instructions, which, when the program is executed by a computer, cause the computer to carry out the method of any of the embodiments of the computer-implemented method is advantageous with respect to the issues discussed above.

FIG. 1 shows a schematic flow diagram of a computer-implemented method according to an embodiment.

The computer-implemented method controls a robot 2 that assists a human 3 in an environment 4 of the robot in performing a task or achieving a target. The method is implemented in a system 1, which controls operations of the robot 2. An embodiment of the system 1, will be discussed in more detail with the block diagram of FIG. 2 displaying an exemplary system structure.

The method comprises a step S1, in which the system 1 obtains by at least one sensor 5, 7 of the system 1, multimodal information on the environment 4 of the robot 2 including information on at least one human 3 acting in the environment 4.

Concerning human machine interfaces, the term "modality" refers to the classification of a single independent channel of input or output between a computer or robot 2 on the one hand and a human 3 on the other hand. Generally different channels may differ based on their sensory nature, e.g., a visual channel and an auditory (aural) channel. Furthermore, the different channels may be defined based on other significant differences in processing, e.g. text processing and image processing. An interaction may be designated unimodal if it uses only one modality for the interaction, and multimodal, if it uses more than one modality for the interaction. If multiple modalities are available for a same interaction task, the system 1 has redundant modalities. Multiple modalities can be used in combination to provide complementary methods that may be redundant but convey information more effectively or reliable. Modalities may include vision, e.g. graphics output via a display, acoustics, e.g., including output of speech via a microphone, or haptics, e.g., including output of vibration or forces via a mechanical actuator. Modalities in a wider sense may also include taste, odor (smell), thermo-conception, for example.

In step S2, the method proceeds with converting, by at least one first x-to-text translator 9, 13 of the system 1, the obtained multimodal information into first text information. The first x-to-text translator 9, 13 is an example of the first converter.

The first converter converts the obtained multimodal input information representing the “x” into a data format the following processing steps preferably implemented by a LLM can process. The first text information into which the first x-to-text translator 9, 13 converts the multimodal information, is in a format that the behavior planner, the intent estimator and the state estimator, in particular when implemented by an LLM, are able to process. In particular, the format of the first text information is a text-based format or text-based data structure. The format of the first text information may include data structures such as a tensor, a vector or a calling-function. The text-based data structure may be a JSON object as a standard text-based format for representing structured data based on JavaScript object syntax.

In step S3, an intent estimator estimates an intent of the at least one human 3 based on the first text information provided by the first x-to-text translator 9, 13.

In step S4, a state estimator determines a current state of the environment 4 including the at least one human 3 based on the first text information. The state of the environment includes a state of the robot 2 and a state of the human 3. The state information may also include a state of objects 61 present in the environment 4 of the robot 2 and the human 3.

The step S5 of the computer-implemented method includes planning, by a behavior planner of the system 1, based on the current state of the environment 4 and the estimated intent of the at least one human 3, a behavior of the robot 2 including at least one multimodal action for execution by the robot 2. Continuing from step S5, the method then proceeds with Step S6 of generating control information including second text information on the at least one multimodal interaction output planned for execution by the robot 2. The behavior planner is implemented using a large language model LLM.

In step S7, the method subsequently converts by using a second text-to-x translator 12, 14 of the system 1, the generated second text information provided by the behavior planner into multimodal actuator control information for controlling the actuators 6, 8 of the robot 2. The second text-to-x translator 12, 14 is an example of the second converter.

The second text information as input to the second text-to-x translator 12, 14 for conversion into multimodal actuator control information is in a format that the large language model LLM is able to process. In particular, the format of the second text information is a text-based format or text-based data structure. The format of the second text information may include data structures such as a tensor, a vector. The text-based data structure may be a JSON object as a standard text-based format for representing structured data based on JavaScript object syntax.

The multimodal actuator control information is then output to the actuators 6, 8 of the robot 2 for executing the planned multimodal interaction output in order to assist the human 3 in accomplishing a task according to the determined intent.

In step S8, the method controls the actuators 6, 8 of the robot 2 based on the multimodal actuator control information, therefore assisting the human 3 in accomplishing a task by executing the at least one multimodal action. The robot 2 performs the planned at least one multimodal interaction output that includes at least one multimodal action using the actuators 6, 8.

Figure 2:
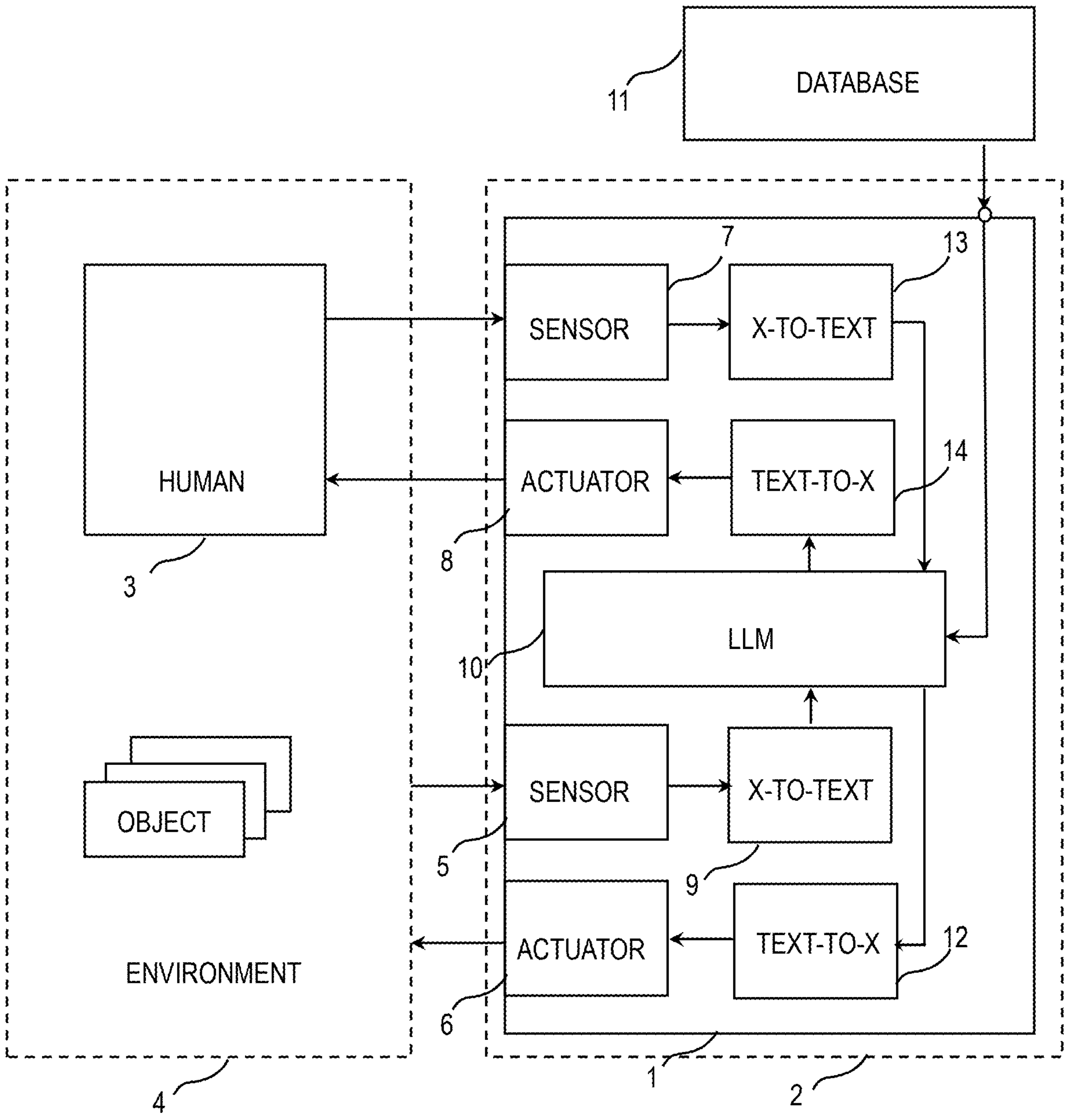
FIG. 2 presents an overview of the architecture of the system for controlling a robot in an embodiment.

FIG. 2 presents an overview of the architecture of the system for controlling a robot in an embodiment.

The system 1 for controlling a robot 2 that collaborates with a human 3 in the environment 4 of the robot 2 as depicted in FIG. 2 may form part of the robot 2. Alternatively, the system 1 may at least in part be implemented in a distributed manner, e.g., distributing the processing between local system elements, e.g. elements of the robot 2 and remote elements of the system 1, e.g., remote elements implemented on at least one remote server 43, 44. Alternative hardware configurations suitable for the system 1 will be discussed with reference to FIG. 6 in more detail.

The system 1 depicted in FIG. 2 comprises two sensors 5, 7 configured to obtain multimodal information on the environment 4 of the robot 2 including information on at least one human 3 acting in the environment 4.

The system 1 of FIG. 2 comprises a first sensor 7, which obtains an input from the human 3. The first sensor 7 may, in particular, enable interacting with the human 3 by acquiring information from the human 3 by visual, acoustic or haptic means.

The system 1 comprises a second sensor 5, which perceives the environment 4.

The system 1 comprises two first translators 9, 13 (x-to-text translators) configured to convert the obtained multimodal information obtained by the sensors 5, 7 into text information. The system 1 provides the text information generated by the first translators 9, 13 to a large language model 10 (LLM 10). The two first translators 9, 13 are examples of the first converter.

Current LLMs involve the use of deep learning and neural networks for specifically addressing language-based tasks and excel in understanding and generating human-like text. A LLM is a type of artificial intelligence (AI) algorithm that uses deep learning techniques and large data sets to understand, summarize, generate and predict new content. LLMs are a type of generative AI that has been specifically architected to help generate text-based content. In the field of AI, a language model serves as a basis to communicate and generate new concepts. All language models are trained on a set of data in an initial training phase, use various techniques to infer relationships and then generate new content based on the trained data of the language model. Language models are common in natural language processing (NLP) applications where a user inputs a query in natural language to generate a result. The LLM is the evolution of the language model concept in AI that expands the data used for training and inference resulting in a significant increase in the capabilities of the AI model.

The first translators 9, 13 may generate the text information based on predetermined rules (rule-based translator), based on predetermined models (model-based translator) or based on a LLM. The text information may include a plurality of individual text elements. At least some of the text elements may be associated with each other.

The LLM 10 (LLM module 10) may further acquire information from a database 11. The further information may, in particular include model data for the LLM 10.

The LLM 10 performs functions including intent estimation, state estimation, and behavior planning based on the multimodal information that had been converted into text information by the at least one first translator 9, 13. Hence the LLM 10 combines the functions of an intent estimator, a state estimator and a behavior planner.

The LLM 10 may be pre-trained via prompt engineering in order to perform the functions of intent estimation, state estimation, and behavior planning based on the multimodal information that had been converted into text information. Pre-training may be performed in a training phase before a use of the LLM in an operating phase for assisting the human.

The LLM 10 plans the behavior of the robot 2. The behavior of the robot 2 includes at least one of at least one physical action to be executed by the robot 2 and an output of information (multimodal interaction output) in a multimodal interaction of the robot 2 with the human 3.

The intent estimator estimates an intent of the at least one human 3 based on the first text information.

The state estimator determines a current state of the environment 4 including the current state of the at least one human 3 based on the first text information. The current state of the environment may include an object state of at least one object 61, which forms part of the environment 4.

The behavior planner plans, based on the current state of the environment 4 and the estimated intent of the at least one human 3, a behavior of the robot 2 including at least one multimodal interaction output for execution by the robot 2. The behavior planner generates control information including second text information on the at least one multimodal interaction output for implementing the planned behavior using the actuators 6, 8 of the robot 2.

The system 1 of FIG. 2 comprises two second translators 12, 14 (text-to-x translators 12, 14) configured to convert the generated second text information provided by the LLM 10 into multimodal actuator control information. The two second translators 12, 14 are examples of the second converter.

The system 1 depicted in FIG. 2 includes the second translators 12, 14 including one second translator 12 for converting the second text information provided by the LLM 10 into multimodal actuator control information for the first actuator 6 and one second translator 14 for converting the second text information provided by the LLM 10 into multimodal actuator control information for the second actuator 8.

The second translators 12, 14 may generate the multimodal actuator control information based on predetermined rules (rule-based translator), based on predetermined models (model-based translator) or based on a LLM.

The system 1 may comprise a robot controller 69 configured to control the actuators 6, 8 of the robot 2 based on the multimodal actuator control information provided by the second translators 12, 14.

The actuators 6, 8 may include actuators 6, 8 for physically interacting with the environment 4, e.g., with objects 61 forming part of the environment 4. Interacting physically with the environment 4 may include grasping objects 61, moving objects 41, or moving the robot 2 in the environment 4.

In addition, the actuators 6, 8 may include actuators 6, 8, which convey information to the environment 4.

In particular, a first actuator 8 of the actuators 6, 8 may enable interacting with the human 3 by outputting information to the human 3 by visual, acoustic or haptic means.

The first sensor 7 and the first actuator 8 in combination enable the robot 2 to interact with the human 3 in the shared environment 4.

Figure 3:
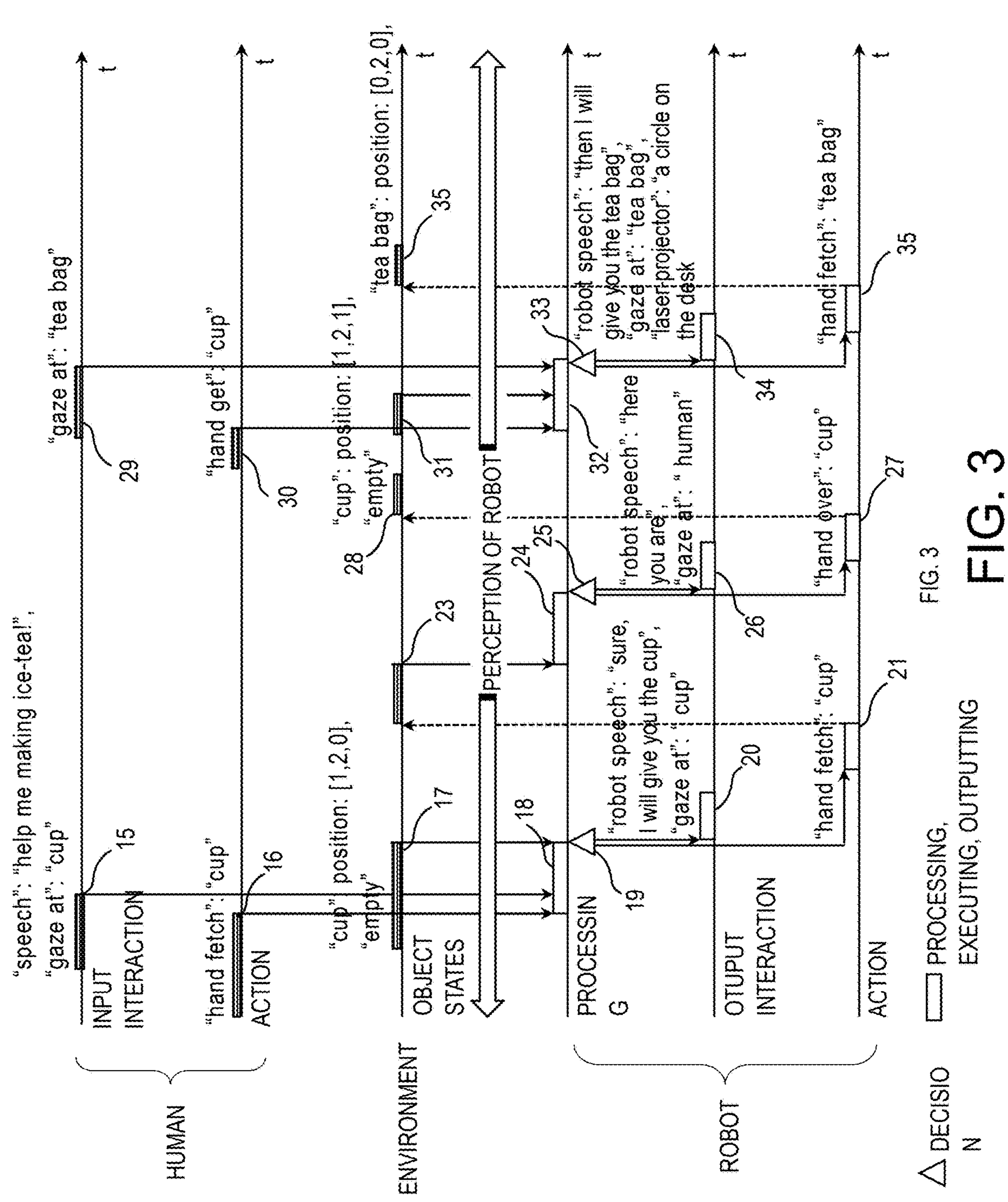
FIG. 3 illustrates a workflow of the system in an application example.

FIG. 3 illustrates a workflow of the system 1 in an application example.

The system 1 is used to control the robot 2 collaborating with the human 3 in a household environment. FIG. 3 illustrates the workflow in specific scenario for a time using respective time axis in the horizontal direction for the human 3 in the upper portion of FIG. 3, the environment 4 in the central portion of FIG. 3 and the robot 2 in the lower portion of FIG. 3, wherein the time scale of each of the variables corresponds to each other.

Concerning the human 3, FIG. 3 displays an input and an action each on an individual time axis in the x-direction.

Concerning the environment 4, FIG. 3 depicts object states of objects 61 in the environment 4 on a time axis in the x-direction.

A processing, outputting of information and execution of a planned multimodal interaction output by the robot 2 each bases on a perception of the environment 4 including the objects 61 by the robot 2, using its sensors 5, 7 and a respective processing of the acquired information on the environment 4.

Concerning the robot 2, FIG. 3 depicts the processing by the robot 2, an output of information by the robot 2, and an action performed by the robot 2 each on an individual time axis in the x-direction.

The processing of the robot 2, an output provided by the robot 2, and an action performed by the robot 2 is indicated by void rectangles of a respective time length on the time axis in the lower part of FIG. 3.

Each processing of the robot terminates with a respective decision for at least one of an action, an output, or, not shown in FIG. 3 that neither an output nor an action is to be decided, and the decision is indicated by a triangle on the processing axis of FIG. 3.

The scenario in FIG. 3 starts with the human 3 starting an interaction with the robot 2 by inputting the spoken statement “help me make ice tea” to the robot 2. The human 3 accompanies the spoken statement of the interaction input 15 with a gaze directed towards a cup present in the environment 4.

Additionally, an at least in part simultaneously, the human 3 executes an action by fetching the cup that is present in the environment 4 as one specific object 61.

The system 1 forms part of the robot 2 and acquires multimodal information on the environment 4 including the cup as an object 61 in the environment and the human 3. The robot 2 perceives the current scenario in the environment 4 based on the acquired information, which includes acoustic information on the environment 4 and visual information on the environment 4. The system 1, in particular the x-to-text converter 9, 13 converts the acquired multimodal information into text information on the environment 4.

The visual information associated with the perceived interaction input 15 converted into text information includes the text information elements “gaze at” and “cup”.

The acoustic information associated with the perceived interaction input 15 converted into text information includes the information elements “speech” and “help me making ice tea”.

The visual information associated with the perceived action 16 performed by the human 3 converted into text information includes the text information elements "hand fetch" and "cup".

The system 1 interprets the visual information on the environment 4, which includes visual information on object states, in particular a current object state 17 of the cup that is present in the environment. The interpreted visual information on the cup enables the system 1 to determine a current state of the cup. The current state of the cup is converted into text information by the x-to-text translator 9, 13.

The visual information associated with the perceived object state 17 of the cup converted into text information includes the text information elements "cup", "position [1, 2, 0]", and "empty".

The text information generated by the x-to-text translator 9, 13 bases on the multimodal information obtained by the sensors 5, 7 of the system 1, and includes the individual text information elements is provided as input to the LLM 10 of the system 1. The LLM 10 processes the input text information in the processing block 18, which concludes with a decision 19 (decision point 19). The LLM 10 plans a suitable behavior of the robot 2 in response to the text information elements input to the LLM 10. The planned behavior in the scenario underlying FIG. 3 includes one specific multimodal action and is output including the text elements "robot speech" associated with "sure, I will give you the cup", "gaze at" associated with "cup", and "hand fetch" associated with "cup". The LLM 10 provides the text elements of the planned behavior to the text-to-x translators 12, 14. In particular, the LLM 10 provides the text elements "robot speech": "sure, I will give you the cup", and "gaze at": "cup" to the text-to-x translator 14, which converts the text elements in a control signal for controlling a multimodal interaction output 20 by respective actuators 8 of the system 1, in particular of the robot 2. In the scenario of FIG. 3, the robot 2 provides via a loudspeaker the speech output "sure, I will give you the cup", which represents acoustic information from the robot 2 to the human 3. In addition, the robot 2 expressly directs its gaze towards the cup, and accordingly also provides visual information to the human 3.

Additionally, the LLM 10 provides the text elements "hand fetch": "cup" to the text-to-x translator 12, which converts the text elements in a control signal for controlling an action 21 corresponding to the information included in the text information for execution by a respective actuators 6 of the system 1, in particular the robot 2. In the scenario of FIG. 3, the robot 2 deploys its arm with a two-grip manipulator for fetching the cup. Hence, the robot 2 influences via the executed action 21 and amends the state of the environment 4. In the scenario of FIG. 3, the robot 2 fetches the cup and moves the cup. The spatial position of the cup in the environment 4 changes accordingly. The system 1 determines, based on obtained information on the environment 4 from the sensor 7, the amended object state of the cup. The amended object state of the cup is reflected in the text information elements "cup", "position [1, 2, 1]", and "empty", which the x-to-text translator 9, generates based on the multimodal information obtained by the sensor 5 of the system 1. The x-to-text translator 9 provides text information elements "cup", "position [1, 2, 1]", and "empty" as input to the LLM 10 of the system 1.

The LLM 10 processes the input text information in the processing block 24, which concludes with a decision 25. The LLM 10 plans a suitable behavior of the robot 2 in response to the text information elements input to the LLM 10. The planned behavior in the scenario underlying FIG. 3 includes one specific multimodal action and is output including the text elements "robot speech" associated with "sure, I will give you the cup", "gaze at" associated with "cup", and "hand fetch" associated with "cup". The LLM 10 provides the text elements of the planned behavior to the text-to-x translators 12, 14. In particular, the LLM 10 provides the text elements "robot speech": "here you are", and "gaze at": "human" to the translator 14, which converts the text elements in a control signal for controlling a multimodal interaction output 26 by respective actuators 8 of the system 1, in particular of the robot 2. In the scenario of FIG. 3, the robot 2 provides via a loudspeaker the speech output "here you are", which represents acoustic information from the robot 2 to the human 3. In addition, the robot 2 expressly directs its gaze towards the human, and accordingly also provides visual information to the human 3.

The LLM 10 provides the text elements "hand over": "cup" to the text-to-x translator 12, which converts the text elements into a control signal for controlling an action 27 corresponding to the information included in the text information for execution by a respective actuators 6 of the robot 2. In the scenario of FIG. 3, the robot 2 deploys its arm with the two-grip manipulator 6.1 holding the cup, moves it into gripping distance of the human 3, and hands the cup to the human 3. The robot 2 executes the action 27 and amends the state of the environment 4 again with respect to the cup. The spatial position of the cup in the environment 4 changes to a new position and to a new object state. The system 1 determines, based on obtained information on the environment 4 from the sensor 7, the amended object state 28 of the cup. The amended state of the cup is reflected in the text information elements "cup", "position [1, 3, 1]", and "empty", which the x-to-text translator 9, generates based on the multimodal information obtained by the sensor 5 of the system 1. The x-to-text translator 9 provides text information elements "cup", "position [1, 3, 1]", and "empty" as input to the LLM 10 of the system 1.

The scenario underlying the flowchart depicted in FIG. 3 now evolves further. At least in part simultaneously with the changing object state 28, the human 3 executes an action by fetching the cup that the robot 2 hands to him in the environment 4. Moreover, in order to proceed with his announced intention of preparing a cup of ice tea, the human looks at a tea bag, which represents a further object 61 in the environment 4.

The system 1 acquires multimodal information on the environment 4 including the moved cup as an object 61 in the environment and the human 3. The robot 2 perceives the current scenario in the environment 4 based on the acquired information, which includes acoustic information on the environment 4 and visual information on the environment 4. The system 1, in particular the x-to-text converter 9, 13, converts the acquired multimodal information into text information on the environment 4.

The visual information associated with the perceived interaction input 29 by the human 3 to the robot 2 is converted into text information and includes the text information elements "gaze at" and "tea bag".

The visual information associated with a perceived action 30 performed by the human 3 converted into text information includes the text information elements "hand get" and "cup".

The system 1 interprets the visual information on the environment 4, which includes visual information on object states, e.g., a current object state 28 of the cup that is present in the environment included in text information elements "cup", "position [1, 3, 1]", and "empty", and the text information elements "gaze at": "tea bag", and "hand get": "cup". The system 1 provides the text information including the text information elements as input to the LLM 10 of the system 1.

The LLM 10 processes the input text information in the processing block 32, which concludes with a decision 33. The LLM 10 plans a suitable behavior of the robot 2 in response to the text information elements input to the LLM 10. The planned behavior in the scenario underlying FIG. 3 includes one specific multimodal action and is output including the text elements "robot speech" associated with "then I will give you the tea bag", "gaze at" associated with "tea bag", "laser projector" associated with "a circle on the desk", and "hand fetch" associated with "tea bag". The LLM 10 provides the text elements of the planned behavior to the text-to-x translators 12, 14. In particular, the LLM 10 provides the text elements "robot speech": "then I will give you the tea bag", and "gaze at": "tea bag" to the translator 14, which converts the text elements in a control signal for controlling a multimodal interaction output 34 by respective actuators 8 of the system 1. In the scenario of FIG. 3, the robot 2 provides via a loudspeaker the speech output "then I will give you the tea bag", which represents acoustic information from the robot 2 to the human 3. In addition, the robot 2 expressly directs its gaze towards the tea bag, and accordingly also provides visual information to the human 3. Yet further, the robot uses a laser projector, representing an actuator available to the robot 2, to project a circle onto a defined position onto the desk, which also corresponds to providing visual information to the human 3.

The LLM 10 provides the text elements "hand fetch": "tea bag" to the translator 12, which converts the text elements in a control signal for controlling an action 35 corresponding to the information included in the text information for execution by a respective actuators 6 of the robot 2. In the scenario of FIG. 3, the robot 2 deploys its arm with the two-grip manipulator 6.1, and grasps the tea bag at its current position in the environment 4. The robot 2 executes the action 35 and amends the state of the environment 4 again with respect to the tea bag. The spatial position of the tea bag in the environment 4 changes to a new position and to a new object state 35. The system 1 determines, based on obtained information on the environment 4 from the sensor 7, the amended object state 35 of the tea bag. The amended state of the tea bag is reflected in the text information elements "tea bag", "position [0, 2, 0]", which the x-to-text translator 9, generates based on the multimodal information obtained by the sensor 5 of the system 1.

The flowchart ends at this point in time with the shown example of the robot 2 supporting the human 3 in performing the task of preparing a cup of tea. The process of preparing the task of tea will proceed in an entirely corresponding manner with further interaction input, interaction output, converting of obtained information into text information, planning, by the LLM 10, converting of planned behaviors into control information and controlling the actuators of the robot 2 based on the control information until the task of preparing the cup of tea is finally achieved in collaboration between the human 3 and the robot 2 that is acting under control of the system 1.

Figure 4:
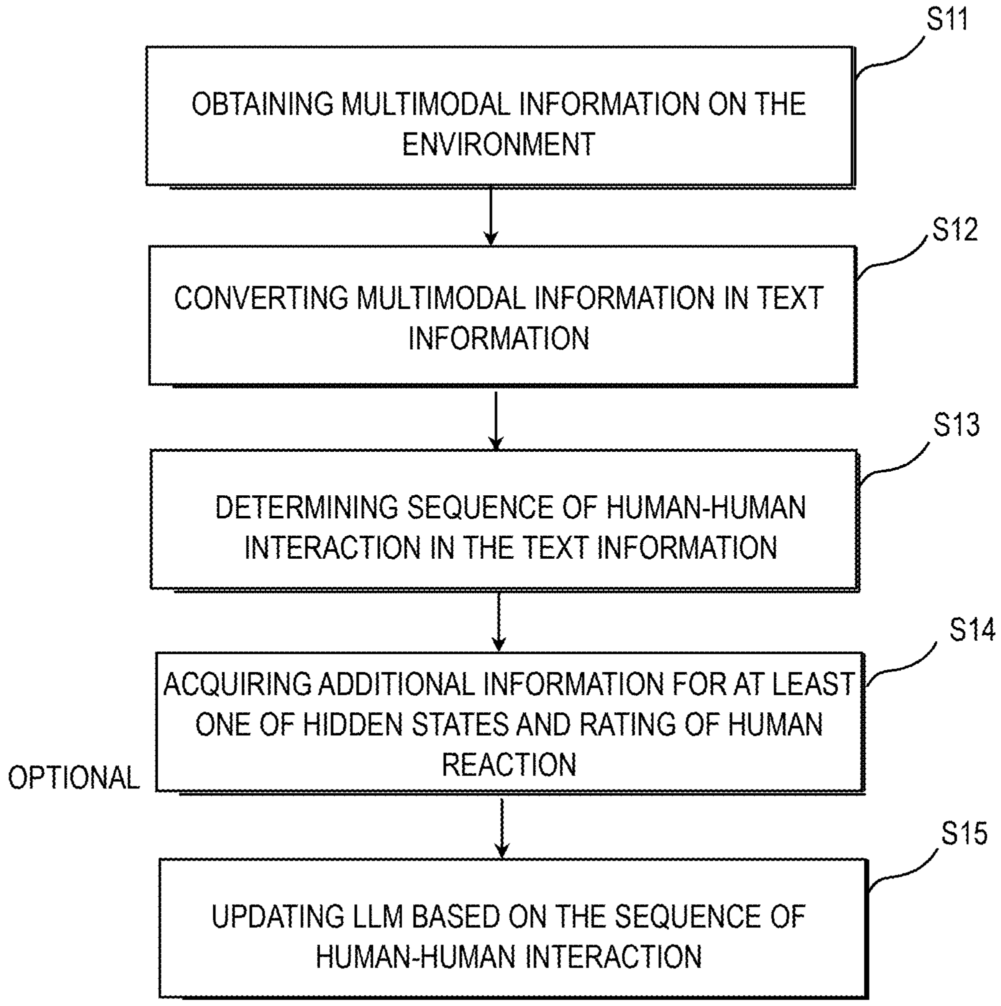
FIG. 4 shows a schematic flow diagram of acquiring human-human interaction data in an embodiment of the computer-implemented method.

FIG. 4 shows a schematic flow diagram of acquiring human-human interaction data in an embodiment of the computer-implemented method. The LLM 10 may include, prompts, a database or a model, which includes examples and rules that are generated based on manual input by an expert.

For example, a prompt of the LLM 10 could include rules comprising: "as a supportive robot, you should deliver your intent clearly to the human", and "when you hand over an object, you should say the purpose of it, and your gaze should firstly look at the object, then look at the human"

A positive example included in the LLM 10 may comprise, text information as input to the LLM 10, reading "human says: "help me to make the ice tea", "human gazes at" associated with "the cup" and "human executes action" associated with "left hand reaching to the cup".

The LLM 10 may further comprise text information as an output that includes an intent estimation for the human with "estimated target" associated with "making ice tea". The text information as an output may further comprise estimated two actions executed by the human that include "picking up the cup with the left hand" and "put the teabag into the cup with the right hand".

The text information as an output also includes a supportive action that is executed by the human "hand over the cup to the human to the left hand of the human". The. The text information as an output also includes a multimodal interaction output comprising "gaze at" associated with "the cup", and "speech" associated with "I will give you the cup, then you can put the teabag into it".

Alternatively or additionally, the LLM 10 comprises a database of examples. The database may be a vectorized database. A vectorized database is particularly advantageous for the LLM 10 to retrieve information from the vectorized database e.g., by using a technology such as Retrieval Augmentation Generation.

The example data may also be generated or updated based on an observed human-human interaction. The actual data may be collected by the system 1 based on the data structure as discussed with reference to FIG. 3 in more detail based of the observed human-human interaction of a first human (human 3), which is supported by a second human (human supporter) filling the position of the robot 2.

Hidden states, e.g. an intent or planned behavior of the first and second human, or a respective rating of an observed action/interaction input by the first human and a responsive interaction output/(re-) action by the second human may be performed manually for teaching the model.

Rating or labelling observed action/interaction input by the first human and a responsive interaction output/(re-) action may include labelling the observed action/interaction input by the first human and a responsive interaction output/(re-) action with a positive feedback or a negative feedback respectively.

Inputting of hidden states and manually labelling for teaching the model may be performed online during the process of collecting the interaction data. Additionally or alternatively, the inputting of hidden states and manually labelling for teaching the model may be performed offline.

The process of FIG. 4 may be performed in the system 1 as discussed with reference to the block diagram of FIG. 2 and the implementation structure shown in FIG. 6.

The method for acquiring human-human interaction data starts with a step S11 of obtaining multimodal information on the environment 4 via the sensors 5, 7. In the environment 4, at least the first human 3 and the second human are present.

Step S11 basically corresponds to step S1 of the flowchart of FIG. 1.

In step S12, the system 1, in particular the x-to-text translators 9, 13 convert the multimodal information obtained from the environment 4 into corresponding text information.

Step S12 basically corresponds to step S2 of the flowchart of FIG. 1.

In step S13, the system 1 determines a sequence of human-human interactions in the text information generated in step S12.

In step S14, the system 1 acquires additional information for at least one of hidden states and a rating for human reactions input manually by a person. The system 1 may perform step S14 optionally. Step S14 may be performed either online during the sequence of steps S11 to s15 or offline on stored text information generated by converting the multi-modal information.

Hidden states may include, e.g., a determined intent or plans of the first human (assisted person).

The rating for human reactions may include, e.g., a rating or assessment of a reaction of the second human (supported person) of the first human (assisted person) by an observer, e.g. including labels, which may respectively include a selected one of the available labels (ratings) "good feedback", "bad feedback" in a simple scenario.

In step S15, the system 1 updates a database 11, e.g., that stores the model of the LLM 10 used for the behavior planning based on the sequence of human-human interactions determined in step S13.

Figure 5:
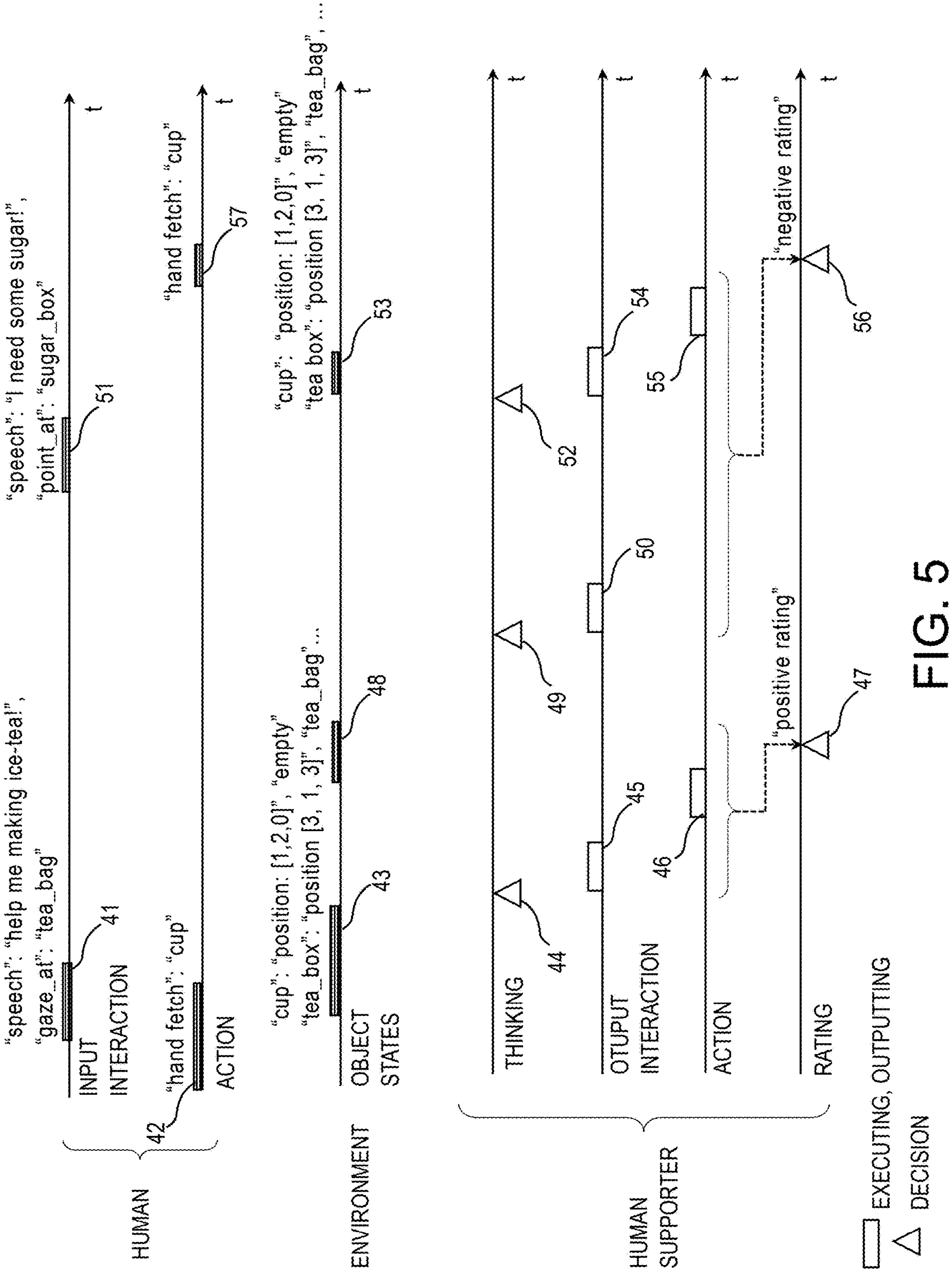
FIG. 5 illustrates a workflow of the system in an application example of acquiring human-human interaction data in an embodiment of the computer-implemented method.

FIG. 5 illustrates a simplified workflow of the system 1 in an application example of collecting human-human interaction data in an embodiment of the computer-implemented method.

The scenario bases on the scenario of preparing ice-tea as introduced with respect to FIG. 3 and includes the human 3 as the first human in the household environment 4. In addition to the first human, a second human is present in the environment 4. The second human fills the role of supporting the first human in the task of preparing the ice-tea in correspondence to the application scenario of FIG. 3, in which the robot 2 supported the human 3 in the performing the respective task.

The system 1 may be implemented separate from the robot 2, including sensors 5, 7 adapted to observe the environment 4 including objects 61 forming part of the environment 4.

The objects 61 may include a cup, a sugar box, and a tea box holding at least one tea bag.

In the application scenario of FIG. 5, the system 1 is used to collect time series data of the first human interacting with the second human in the household environment 4 in the task of preparing the ice-tea. FIG. 5 illustrates similar to FIG. 3 the workflow in the scenario for a time using respective time axes in the horizontal direction for the first human (human 3) in the upper portion of FIG. 5, the environment 4 in the central portion of FIG. 5 and the second human (supporting human) in the lower portion of FIG. 5, wherein the time scale of each of the time axes corresponds to each other.

Concerning the human 3, FIG. 5 displays an input and an action each depicted on an individual time axis in the x-direction.

Concerning the environment 4, FIG. 5 depicts object states of objects 61 in the environment 4 on a time axis in the x-direction.

Thinking of the second human, outputting of information and execution of an action by the second human each bases on a perception of the environment 4 including the objects 61 and the second human by the sensors 5, 7 of the system 1 and a respective processing of the acquired information on the environment 4, the objects 61 and the second human.

Concerning the second human, FIG. 5 indicates a decision taken by the second human, an output of information by the second human, and an action performed by the second human each on an individual time axis in the x-direction. The output provided by the second human, and the action performed by the second human is indicated by void rectangles of a respective time length on the time axis in the lower part of FIG. 5.

Each thinking of the second human is assumed to terminate with a respective decision for at least one of an action, an output, or, not shown in FIG. 3 that neither an output nor an action is to be decided, and the decision is indicated by a triangle on the thinking axis in the lower part of FIG. 5.

The scenario in FIG. 5 starts with the first human (human 3) starting an interaction with the second human by providing the spoken statement "help me make ice tea" to the second human. The first human accompanies the spoken statement of the interaction input 51 with a gaze directed towards a cup present in the environment 4. Additionally, at least in part simultaneously with the spoken statement, the first human executes a physical action by fetching the cup present in the environment 4 as one specific object 61.

The system 1 acquires multimodal information on the environment 4 including the cup as an object 61 in the environment and the first human. The system 1 perceives the current scenario in the environment 4 based on the acquired information, which includes acoustic information on the environment 4 and visual information on the environment 4. The system 1, in particular the x-to-text converter 9, 13 converts the acquired multimodal information into text information on the environment 4.

The visual information associated with the perceived interaction input 41 of the first human converted into text information includes the text information elements "gaze at" associated with "tea bag".

The acoustic information associated with the perceived interaction input 41 converted into text information includes the text information elements "speech" associated with "help me making ice tea".

The visual information associated with the perceived action 16 performed by the human 3 converted into text information includes the text information elements "hand fetch" associated with "cup".

The system 1 interprets the visual information on the environment 4, which includes visual information on object states, in particular a current object state 43 of the cup, the tea box, and the teabag that are present in the environment 4. The interpreted visual information on the cup enables the system 1 to determine a current state of the cup. The interpreted visual information on the tea box enables the system 1 to determine a current state of the tea box, which includes the current position of tea box and the tea-box holding at least one teabag. The current object states of the cup, the tea box, and the teabag are converted into text information by the x-to-text translator 9, 13.

The visual information associated with the perceived object state 43 of the cup converted into text information includes the text information elements "cup", "position [1, 2, 0]", and "empty". The visual information associated with the perceived object states 43 of the tea box converted into text information includes the text information elements "tea_box", "position [3, 1, 3]", and "teabag".

The text information generated by the x-to-text translator 9, 13 bases on the multimodal information obtained by the sensors 5, 7 of the system 1, and includes the individual text information elements that could be provided as input to the LLM 10 of the system 1 as a prompt. A prompt represents an instruction to the LLM 10. Generally, in an interaction with an LLM, a user provides prompts to the LLM. Ideally, a prompt elicits an answer from the LLM that is correct and, adequate in form and content.

In a corresponding manner as discussed for generating the text information elements by the x-to-text translators 9, 13 from the obtained multimodal information provided by the sensors 5, 7 on the interaction output 41, the action 42 and the object states 43, the system 1 processes obtained information on an interaction input 45, an action 46, which the second human (supporting human) performs after a decision point 44 immediately after the interaction output 41, the action 42 and the object states 43 have been perceived by the system 1.

The system 1 provides the information on the interaction input 45 and the action 46 by the second human to the x-to-text translators 9, 13, which convert the obtained information into corresponding text information on the interaction input 45 and the action 46.

The system 1 may then provide the generated text information elements including the text information elements for the interaction output 41 and the action 42 by the first human, the information on the object states 43 in the environment 4, and the information on the interaction input 45 and the action 46 of the second human for inspection by a human expert to a human-machine-interface. The human expert may assess the reaction of the second human as included in the text information elements of the information on the interaction input 45 and the action 46 of the second human after the decision point 44 with regard to the text information elements including the text information elements for the interaction output 41 and the action 42 by the first human, and the information on the object states 43 in the environment 4 before the decision point 44. In the exemplary application scenario of FIG. 5, the human expert concludes the reaction of the second human as an appropriate reaction to the interaction output 41 and the action 42 by the first human as well as the information on the object states 43 in the environment 4, and applies a positive rating via the human machine interface to the text information elements including the text information elements for the interaction output 41 and the action 42 by the first human, the information on the object states 43 in the environment 4, and the information on the interaction input 45 and the action 46 of the second human for inspection by a human expert to a human-machine-interface.

In consequence, the set of information including the text information elements comprising the text information elements for the interaction output 41 and the action 42, the information on the object states 43 in the environment 4 as a prompt, and the text information elements comprising the text information elements for the interaction input 45 and the action 46 as a reaction to the prompt may be used to update the LLM 10.

The set of information may be stored in the database 11 for updating the LLM 10 of the system 1 and as training data for other systems.

In addition to the information on the interaction input 45 and the action 46 of the second human, the system 1 may also include the influence of the reaction of the second human due to the interaction input 45 and the action 46 of the second human on the object states 48 of the objects 61 in the environment 4, which may change from the object states 43 to different object states 48.

Alternatively to an online labelling by the human expert via an human machine-interface, the system 1 may record the set of information including the text information elements comprising the text information elements for the interaction output 41 and the action 42, the information on the object states 43 in the environment 4 as a prompt, and the text information elements comprising the text information elements for the interaction input 45 and the action 46, optionally also the object states 48, as a reaction to the prompt in the database 11 for an offline assessment and application of appropriate ratings by the human expert in order to generate the training data for training the LLM 10.

The sequence of steps for collecting a time series of data from observing human interaction between the first human and the second human in FIG. 5 proceeds after applying the positive rating 47 and after updating the object states 48 with a decision point 49 of the second human. The second human may react after the decision point 49 to the changed object states in the environment with a further output interaction 50. The output interaction is followed in a time sequence by the first human providing an input interaction 51 and further amended object states 53 in the environment 4.

The sensors 5, 7 of the system 1 continuously monitor the environment 4 and the thus the first human, the second human and the objects 61 in the environment. The system 1 generates information on the environment 4, provides the generated information to the x-to-text converter 9, 13, which generates text information based on the obtained information on the environment 4.

In the exemplary application scenario of FIG. 5, the text information generated based on the input interaction 51 by the first human includes the text information elements "speech" associated with "I need some sugar", and "point_at" associated with "sugar_box". The text information generated based on amended object information 53 includes the text information element "cup" associated with "position [1, 2, 0]" and with "empty", and the information element "tea_box" associated with "position [3, 1, 3]" and with "tea_bag".

In a corresponding manner, the system 1 generates text information including respective text information elements for the output interactions 50 and 54, and the action 55 of the second human.

The system 1 then determines the sequence of the human-human interactions in the text information, which includes in FIG. 5 the text information elements corresponding to the input interaction 51 and the action 57 of the first human, and the output interactions 50 and 54, and the action 55 executed by the second human. The system 1 further determines the sequence of the human-human interactions in the text information taking the object states 53 of the objects 61 in the environment 4 into regard.

At the decision point 56, the system 1 presents the determined sequence of human-human interactions in the text information via the human machine interface to the human expert for rating. In the example shown in FIG. 5, the human expert assesses the sequence of human-human interactions as not helpful with regard to reaching a task and labels the sequence of human-human interactions in the text information presented to him with a negative rating.

Using the human-machine interface, the human expert may further add information in the form of text information on hidden states, which are not observable for the sensors 5, 7 of the system 1 although the states may influence on the behavior planning for the robot 2, or the assessment of the human-human interaction between the human 3 and the human supporter with respect to addressing a task.

Analyzing the human-human interaction based on the observed behavior of the human 3 and a human supporter, converting the observed human-human interaction behavior into text information enables a simple and effective manner to present a meaningful description to the human expert for labelling and rating in order to generate training data for training the LLM 10 in planning the behavior of the robot 2.

Figure 6:
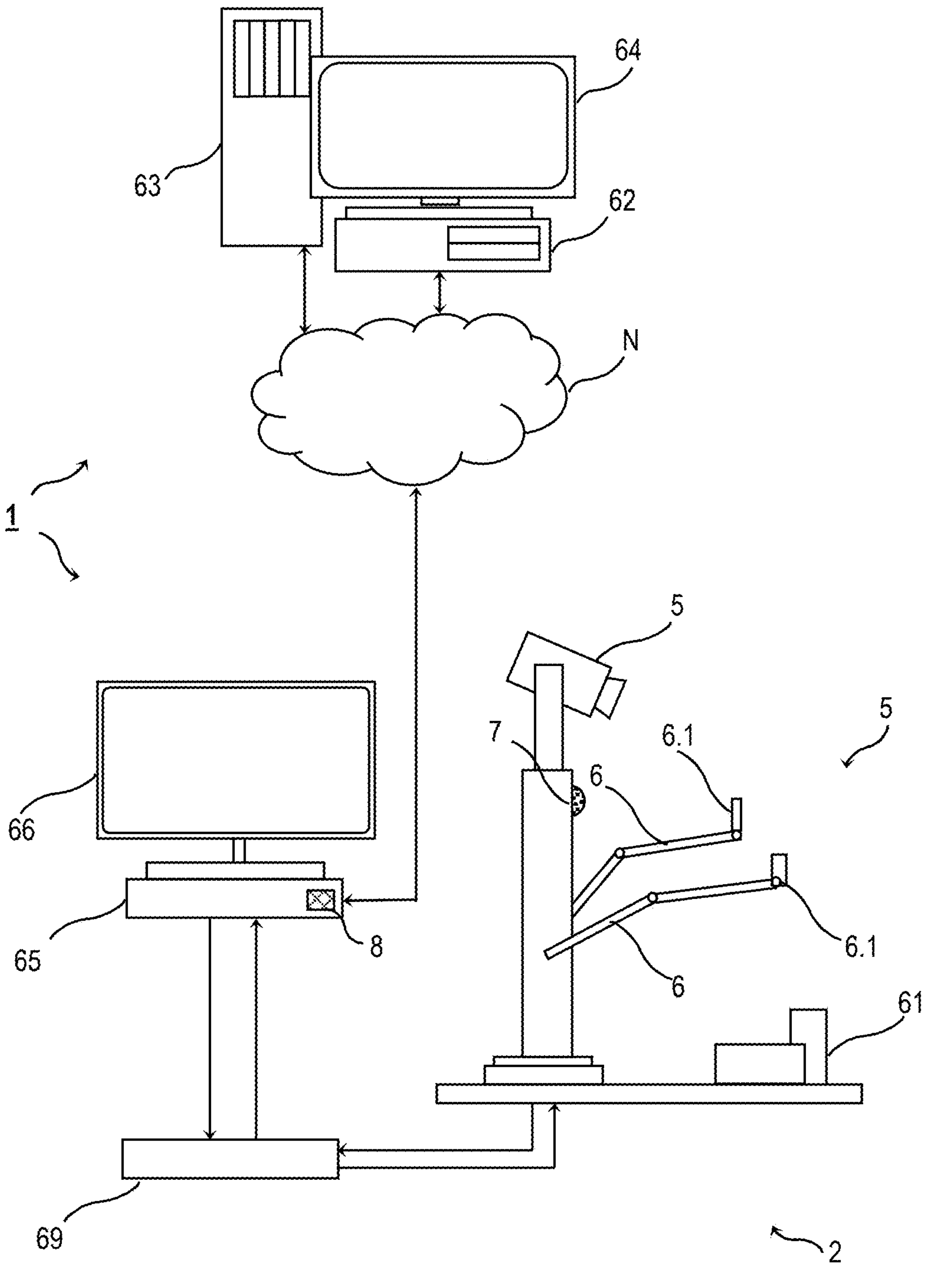
FIG. 6 presents an overview on a high level of abstraction of a hardware architecture for implementing the proposed system.

FIG. 6 presents an overview of an architecture suitable for implementing the system 1 in an embodiment.

The system 1 of FIG. 6 is implemented as a distributed system, which controls a robot 2. The structural elements of the system 1 are linked via a communication network N.

The robot 2 is a stationary autonomous device, which includes a plurality of sensors 5, 7 for sensing the environment 4. The sensors 5, 7 shown in FIG. 6 include a camera sensor 5 for obtaining visual information from the environment 4. The visual information may include images, sequences of images, e.g., videos. The visual information may include monocular or stereo information (3D vision).

The sensors 5, 7 of FIG. 6 include a microphone 7 for acquiring acoustic information (aural information) from the environment 4. The sensors 5, 7 are not limited in number or type of sensor to the shown examples. For example, the sensors 5, 7 may include a plurality of cameras 7. The sensors may include a plurality of types of sensors that further include orientation sensors, velocity sensors, acceleration sensors, temperature sensors, humidity sensors, odor sensors, light sensors, chemical sensors, and tactile sensors in order to name some examples for sensors based on a variety of different modalities for sensing the environment 4.

The sensors 5, 7 may also include sensors arranged physically separate from the robot 2 and integrated into the system 1 via a communication link, which are not explicitly shown in FIG. 6.

The robot 2 may include a plurality of actuators 6, 8. FIG. 6 depicts the robot 2 with two arms 6, each arm having a manipulator 6.1 for grasping, holding, shifting and moving of objects 61 in the environment. The robot arms 6 enable the robot 2 to physically manipulate the environment 4, e.g., including objects 61 in the environment 4.

Alternatively, the robot 2 may be an autonomously moving device, which includes actuators 6, 8 that enable the robot 2 to move around the environment 4.

The robot 2 may be a humanoid robot that has the capability to simulate facial expressions of a human face in order to output information to a human observer.

The system 1 may include actuators 6, 8 that are not physically part of the robot 2. FIG. 6 shows a computer 65 including a display 66 and a loudspeaker 8 arranged on site with the robot 2 in the environment 4. The computer 65 may generate control signals 67 for controlling the robot 2 via a robot controller 69.

The loudspeaker 8 outputs acoustic information to the environment 4, e.g., to a human 3 that the robot 2 assists in performing a task.

The display 66 outputs visual information to the environment 4, e.g. to the human 3. The display may include the display 66 including a display screen displaying the visual information. Alternatively or additionally, the display 66 may include a projector for projecting an image in the environment 4 of the robot 2. Alternatively or additionally, the display 66 may use an augmented reality holographic for outputting the visual information.

Alternatively, the computer 65 may be physically integrated with the robot 2.

The computer 65 provides a human machine interface, e.g. enabling a human expert to access data acquired or generated by the system 1. In particular, the human expert may analyze text information and input labels to human-human interactions presented via the human machine interface. The human machine interface may be implemented via the display 66 and usual input means of the computer 65, including, e.g., a keyboard, a pointing device, a mouse, a trackball, or a microphone.

The computer 65 of FIG. 6 includes a network interface for communicating via the network N with remote servers 62, 64.

The remote server 62 may enable an offline inspection of data and also provides a human machine interface, e.g. enabling a human expert to access data acquired or generated by the system 1 similar to the human machine interface of the computer 65. In particular, the human expert may analyze text information and input labels to human-human interactions presented via the human machine interface. The human machine interface may be implemented via the display 64 of the remote server 62 and the corresponding input means as the computer 65, including, e.g., a keyboard, a pointing device, a mouse, a trackball, or a microphone.

The remote server 63 stores the database 11 and provides data to the LLM 10 via the network N.

The LLM 10 may be implemented using the processing resources of the robot 2, of the computer 65 on site, or remote from the robot 2 using the processing resources of the remote servers 62, 63. The LLM 10 may be implemented in a distributed manner using the processing resources of at least two of the robot 2, the computer 65 and the remote servers 62, 63.

The computer 65 and the remote servers 62, 63 each comprise at least one processor associated with memory for data storage storing program data and application data.

Figure 7:
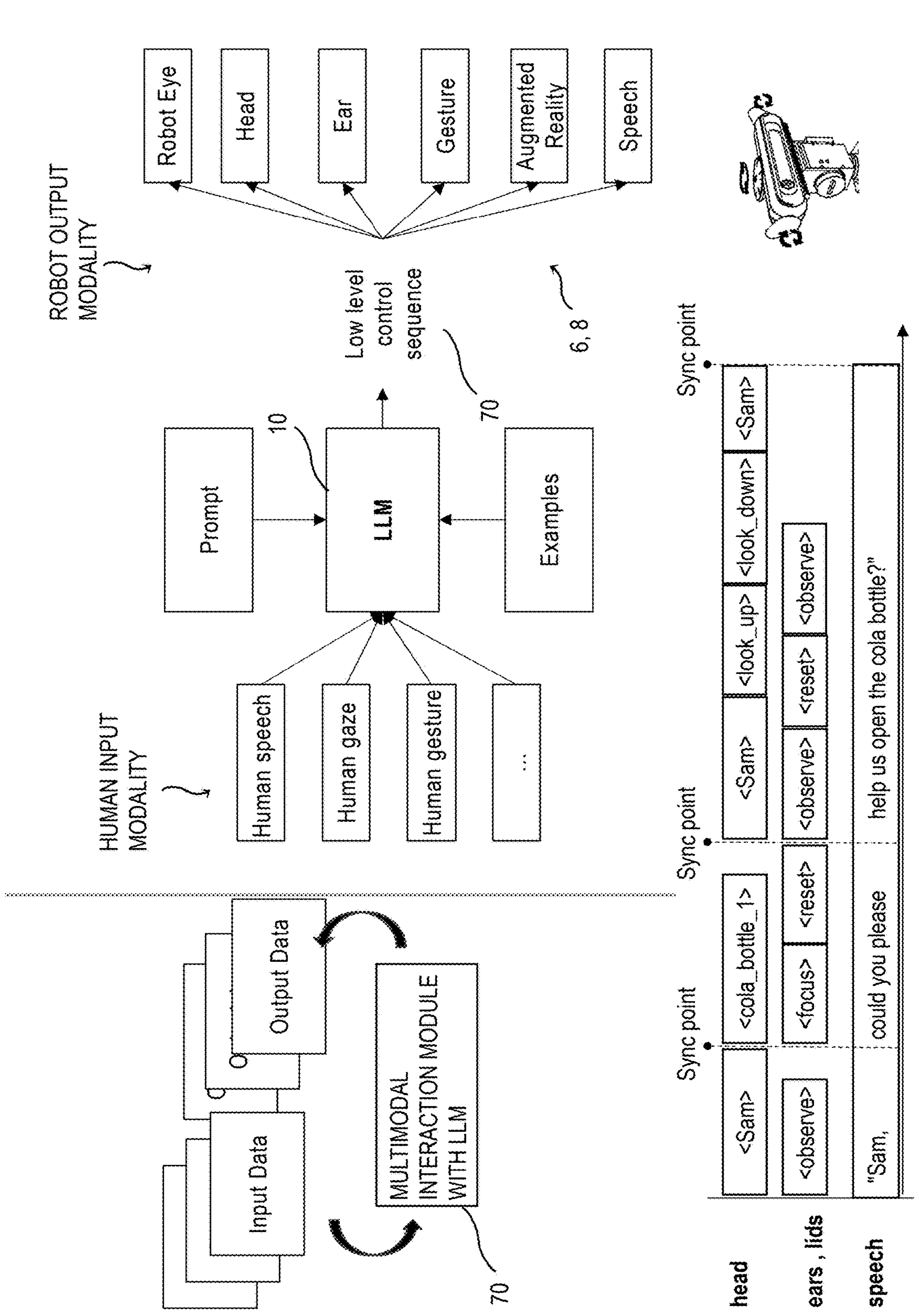
FIG. 7 presents process of concatenating atomic animation clips into multimodal behavior for execution by the robot using atomic animation clips.

FIG. 7 presents process of concatenating atomic animation clips into multimodal behavior for execution by the robot 2 using atomic animation clips for controlling the interaction of the robot 2 with the human 3. In an embodiment, the computer-implemented method providing, to the behavior planner, the text information including information on use of atomic animation clips that drive actuators of the robot 2, which would be sent to LLM via e.g. prompts. The behavior planner includes a multimodal interaction module 70 that includes a large language model LLM. The multimodal interaction module 70, in particular, the LLM obtains as input examples for using the atomic animation clips. The multimodal interaction module 70 then creates new multimodal social behaviors for execution by the robot 2 by concatenating the plural atomic animation clips. Furthermore, the multimodal interaction module 70 synchronizes the individual atomic animation clips of one new multimodal social behavior for execution by the robot 2, in particular the actuators 6, 8 in combination for outputting the new multimodal social behavior.

The lower portion of FIG. 7 illustrates an output of a social behavior by the robot 2 including the plural actuators 6, 8 "head", "ears" and "speech" in a specific scenario. The output of the generated social behavior is a combination of elementary atomic animation clips of the individual actuators synchronized to a common time for output by the actuators 6, 8.

One elementary atomic animation clip for the actuator "ear" is <focus>, which in text format may be defined by "two ears rolling to front and back synchronously, for expressing confirmation of human's command."

One further atomic animation clip for the actuator "ear" is <reset> in which, in text information, "two ears roll to the default position, express an action or a task is finished."

One further atomic animation clip for the actuator "ear" is <deny> in which, as information text includes, "two ears roll to front and back alternatively, for disagreement or unable to do."

For the movable head of a humanoid robot 2, further atomic animation clips defining elementary social behaviors fore execution by a pan-tilt unit (PTU) controlling head movement of the robot may include:

The atomic animation clip <id_person/id_object> which includes in text information "the identifier (id) of an object or a person in the scenario in the environment". For example, the atomic animation clips results in an elementary social behavior that has the head of the robot looking at a cup with the id "cup_1" in the environment.

The atomic animation clip <look_up> includes in text information the "head looking up a bit, used for asking"

The atomic animation clip <nod> includes in text information the elementary social behavior "express confirmation."

The atomic animation clip < "text to speak">: defines speech content streams. The speech content streams may originate from other modules for output via the respective actuators 6, 8 of the robot. The multimodal interaction module 70 may provide a timing for each word included in the text intended output for better alignment with other atomic animation clips included in the social behavior of the robot 2.

Thus, atomic animation clips are elementary clips or chunks that define a basic action that the actuators 6, 8 of the robot execute. Hence, the atomic animation clips are the basic (elementary) social behavior that the control the output of each actuator 6, 8 of the robot 2.

Using the atomic animation clips enables to provide via the LLM of the multimodal interaction module 70 a solution for generating new social behaviors based on input prompts and examples. The examples include scenarios as text information. The solution for generating new social behaviors provides quick solutions, is independent from states of the robot 2, can be applied in zero-shot robot control and highly flexible.

The multimodal interaction module 70 enables using an LLM to drive the lowest level control of the actuators 6, 8 of the robot and reduces a workload for designers and engineers in a design and training phase of the robot 2. Moreover, the current approach of generating sophisticated designs with only limited animation choices is significantly less flexible during operation in the field, often not zero-shot or few shot capable, and hardly adaptable to changes.

Using the atomic animation clips, however, enables using LLMs even for generating low level control of the multimodal behavior of the robot 2, via its actuators 6, 8, as indicated in FIG. 7.

All steps which are performed by the various entities described in the present disclosure as well as the functionalities described to be performed by the various entities are intended to mean that the respective entity is adapted to or configured to perform the respective steps and functionalities.

In the claims as well as in the description the word "comprising" does not exclude the presence of other elements or steps. The indefinite article "a" or "an" with an element does not exclude a plurality of the elements.

A single element or other unit may fulfill the functions of several entities or items recited in the claims. The mere fact that different dependent claims recite certain steps and features of the method does not exclude that a combination of these steps and features cannot combined in an advantageous implementation.

What is claimed is:

1. A computer-implemented method for controlling a robot assisting a human in an environment of the robot, the method comprising:

obtaining, by at least one sensor, multimodal information on the environment of the robot including information on a first human and at least one second human acting in the environment;

converting, by a first converter, the obtained multimodal information into text information in a text-based format or text-based data structure configured for processing by a large language model;

estimating, by an intent estimator, an intent of the first human and the at least one second human based on the text information;

determining, by a state estimator, a current state of the environment including the first human and the at least one second human based on the text information;

determining a sequence of human-human interaction involving the first human and the at least one second human based on the text information;

planning, by a behavior planner, based on the current state of the environment and the estimated intent of the first human and the at least one second human, a behavior of the robot including at least one multimodal interaction output for execution by the robot, wherein the large language model performs estimating the intent, determining the current state, and planning the behavior based on the text information converted from the multimodal information;

generating control information including text information on the at least one multimodal action-interaction;

converting, by a second converter, the generated text information into multimodal actuator control information;

controlling at least one actuator of the robot based on the multimodal actuator control information; and updating a behavior-planning model for planning the behavior of the robot based on the determined sequence of human-human interaction.

2. The computer-implemented method according to claim 1, wherein the first converter includes a large language model, a rule-based x-to-text translator or a model-based x-to-text translator.

3. The computer-implemented method according to claim 1, wherein the second converter includes a large language model, a rule-based text-to-x translator or a model-based text-to-x translator.

4. The computer-implemented method according to claim 1, wherein the method comprises, in the step of planning the behavior of the robot, planning the behavior using a large language model.

5. The computer-implemented method according to claim 4, wherein the text information and the generated control information including the text information are in a format interpretable by the large language model including at least one of a text data format, a JSON object, a tensor, a vector, or a function-calling command.

6. The computer-implemented method according to claim 4, wherein the method further comprises performing prompt engineering for structuring text included in the large language model for executing functions including intent estimation, state estimation, and behavior planning based on the multimodal information converted into text information.

7. The computer-implemented method according to claim 1, wherein the method comprises obtaining model data of the large language model from an external database.

8. The computer-implemented method according to claim 1, wherein the method further comprises generating training data based on an observed human-human interaction in the environment.

9. The computer-implemented method according to claim 1, wherein the method further comprises a step of acquiring feedback from the assisted human, and learning model data for the behavior planner based on the acquired feedback.

10. The computer-implemented method according to claim 1, wherein the method further comprises acquiring, via a user interface, label information including at least one of at least one hidden state associated with the sequence of human-human interaction, and a feedback rating of at least one human-human interaction included in the sequence of human-human interaction.

11. The computer-implemented method according to claim 1, wherein the method further comprises providing, to the behavior planner, the text information including information on use of atomic animation clips that drive actuators of the robot; and concatenating, by the behavior planner, at least two atomic animation clips for generating a new behavior of the robot, or synchronizing different modalities of the multimodal interaction output based on the information on the use of the atomic animation clips.

12. A non-transitory computer readable medium storing a computer program causing the computer to carry out the method of claim 1.

13. A system for controlling a robot that assists a human in an environment of the robot, the system comprising:

at least one sensor configured to obtain multimodal information on the environment of the robot including information on a first human and at least one second human acting in the environment;

a first converter configured to convert the obtained multimodal information into text information in a text-based format or text-based data structure configured for processing by a large language model;

an intent estimator configured to estimate an intent of the first human and the at least one second human based on the text information;

a state estimator configured to determine a current state of the environment including the first human and the at least one second human based on the text information;

a behavior planner configured to plan, based on the current state of the environment and the estimated intent of the first human and the at least one second human, a behavior of the robot including at least one multimodal interaction output for execution by the robot, wherein the large language model performs estimating the intent, determining the current state, and planning the behavior based on the text information converted from the multimodal information, and to generate control information including text information on the at least one multimodal interaction;

a second converter configured to convert the generated text information into multimodal actuator control information;

a controller configured to control at least one actuator of the robot based on the multimodal actuator control information; and the system is configured to determine a sequence of human-human interaction involving the first human and the at least one second human based on the text information, and to update a behavior-planning model for planning the behavior of the robot based on the determined sequence of human-human interaction.

* * * * *